(12) United States Patent
Freeman et al.

(10) Patent No.: US 9,731,230 B2
(45) Date of Patent: Aug. 15, 2017

(54) AERATION DIFFUSER FOR PRESSURIZED LIQUID TREATMENT MODULE AND METHOD OF OPERATING SAME

(71) Applicant: Hydranautics, Oceanside, CA (US)

(72) Inventors: Benjamin Robert Freeman, Cardiff By The Sea, CA (US); Ben Weaver, Oceanside, CA (US); Craig R. Bartels, San Diego, CA (US); Dan Schuneman, Placentia, CA (US); Hailin Ge, Singapore (SG)

(73) Assignee: Hydranautics, Oceanside, CA (US)

( * ) Notice: Subject to any disclaimer, the term of this patent is extended or adjusted under 35 U.S.C. 154(b) by 302 days.

(21) Appl. No.: 14/414,577

(22) PCT Filed: Dec. 27, 2012

(86) PCT No.: PCT/US2012/071807
§ 371 (c)(1),
(2) Date: Jan. 13, 2015

(87) PCT Pub. No.: WO2014/011204
PCT Pub. Date: Jan. 16, 2014

(65) Prior Publication Data
US 2015/0151224 A1 Jun. 4, 2015

Related U.S. Application Data

(60) Provisional application No. 61/671,274, filed on Jul. 13, 2012.

(51) Int. Cl.
*B01D 29/66* (2006.01)
*B01F 3/04* (2006.01)
(Continued)

(52) U.S. Cl.
CPC ............. *B01D 29/66* (2013.01); *B01D 63/02* (2013.01); *B01F 3/0446* (2013.01);
(Continued)

(58) Field of Classification Search
CPC .......... B01D 2313/26; B01D 2321/185; B01D 29/66; B01D 63/02; B01F 2003/04319;
(Continued)

(56) References Cited

U.S. PATENT DOCUMENTS

2003/0075504 A1 4/2003 Zha et al.
2010/0155334 A1 6/2010 Taniguchi et al.

FOREIGN PATENT DOCUMENTS

JP S64-90005 A 4/1989
JP H07-185268 A 7/1995
(Continued)

OTHER PUBLICATIONS

Office Action issued Aug. 30, 2016 in JP Application No. 2015-521591.
(Continued)

*Primary Examiner* — John Kim
(74) *Attorney, Agent, or Firm* — Panitch Schwarze Belisario & Nadel LLP (57) ABSTRACT

An aeration diffuser (12) for a pressurized liquid treatment module includes a base having a gas passageway (32) and a liquid passageway (50) fluidically separated from the gas passageway. Liquid is injectable into the liquid passageway of the base of the diffuser. Liquid flows through the base of the diffuser and into the module to be filtered by filtration membrane(s) within the module. Gas is injectable into the gas passageway of the base of the diffuser. Gas flowes through the base of the diffuser separately from the liquid to
(Continued)

aerate the filtration membrane(s) within the module. Further a module including one or more diffusers and a method of filtration is disclosed.

11 Claims, 4 Drawing Sheets (51) Int. Cl.
*B01D 63/02* (2006.01)
*C02F 1/44* (2006.01)
(52) U.S. Cl.
CPC ...... *B01F 3/04241* (2013.01); *B01F 3/04248* (2013.01); *B01D 2313/26* (2013.01); *B01D 2321/185* (2013.01); *B01F 2003/04319* (2013.01); *B01F 2215/008* (2013.01); *C02F 1/44* (2013.01)

(58) Field of Classification Search
CPC ............ B01F 2215/008; B01F 3/04241; B01F 3/04248; B01F 3/0446; C02F 1/44
See application file for complete search history.

(56) References Cited

FOREIGN PATENT DOCUMENTS

| | | |
|---|---|---|
| JP | 2000051670 A | 2/2000 |
| JP | 2006247540 A | 9/2006 |
| WO | 96/07471 A1 | 3/1996 |
| WO | 03/013706 A1 | 2/2003 |
| WO | 2011/136888 A1 | 11/2011 |

OTHER PUBLICATIONS

International Search Report issued Jun. 6, 2013 in PCT/US2012/071807.
Written Opinion of the Searching Authority dated Jun. 6, 2013 in PCT/US2012/071807.

AERATION DIFFUSER FOR PRESSURIZED LIQUID TREATMENT MODULE AND METHOD OF OPERATING SAME

CROSS-REFERENCE TO RELATED APPLICATION

This application is a Section 371 of International Application No. PCT/US2012/071807, filed Dec. 27, 2012, which was published on Jan. 16, 2014, under International Publication No. WO 2014/011204 A1, and the disclosure of which is incorporated herein by reference. The present application claims priority to U.S. Provisional Patent Application No. 61/671,274, filed Jul. 13, 2012 and entitled "Aeration Diffuser for Pressurized Module."

BACKGROUND OF THE INVENTION

The present invention is directed generally to an aeration diffuser for a pressurized liquid treatment module, which allows for gas scouring of filtration membranes within the module.

To filter or other otherwise treat various types of liquid, such as seawater, wastewater and surface water, fiber membranes ("filtration membranes") are typically used within a module to separate suspended solids and impurities from the liquid. Over time, the impurities will accumulate on a feed side or an exterior surface of the filtration membranes, thereby at least partially clogging or otherwise fouling the filtration membranes. The accumulated impurities are undesirable because they increase resistance to filtration and negatively affect the operation of the filtration membranes by increasing operating pressures or decreasing production.

The accumulation of impurities or fouling of the filtration membranes is typically controlled by physically cleaning the filtration membranes. Commonly, after a period of filtering impurities from the liquid, a physical cleaning is undertaken and the process of filtering and cleaning is repeated. Physical cleaning can include backwashing, which occurs by pumping liquid through the filtration membranes in a direction reverse to the filtration path. Another type of physical cleaning, known as forward flushing, occurs when liquid is pumped tangential to the feed side of the filtration membranes. During forward flushing, no filtration occurs and impurities are removed by a shearing force. A further type of physical cleaning is air scouring, which occurs by bubbling gas along the feed side of the filtration membranes, causing vibrations, which shake impurities loose and create localized eddies with shearing forces at the membrane surface.

To air scour the filtration membranes, conventional prior art systems inject gas (e.g., air) and liquid (e.g., water) through a single, common inlet into a module. In particular, the prior art injects feed water and air into the same opening or set of openings in a bottom of a module. While such prior art can be effective in providing and maintaining aeration to the filtration membranes, such a configuration does not necessarily optimize gas scouring efficiency, and it would be desirable to do so.

In particular, design considerations for introducing feed water into the module for filtering are different than for introducing air into the module for scouring. The opening(s) for feed water must be sufficiently large to allow for efficient draining from the module. However, if the opening(s) is/are too large, then a majority of the air leaves through only a portion of the opening or some of the openings and will not be evenly distributed throughout the module.

Therefore, it would be desirable to optimize gas (e.g., air) distribution within a module without compromising liquid (e.g., feed water) distribution within the module. In particular, it would be desirable to provide fluidically separate and distinct gas and liquid openings or passageways into the module to optimize gas and liquid distribution. The present invention accomplishes the above objectives.

BRIEF SUMMARY OF THE INVENTION

Briefly stated, one aspect of the present invention is directed to an aeration diffuser for a pressurized liquid treatment module including a base having a gas passageway and a liquid passageway fluidically separated from the gas passageway. Liquid is injectable into the liquid passageway of the base of the diffuser. Liquid flows through the base of the diffuser and into the module to be filtered the filtration membrane(s) within the module. Gas is injectable into the gas passageway of the base of the diffuser. Gas flows through the base of the diffuser to aerate the filtration membrane(s) within the module.

Another aspect of the present invention is directed to a combination pressurized liquid treatment module and at least one aeration diffuser. The pressurized liquid treatment module includes an outer shell having a first end and an opposing second end. A longitudinal axis of the outer shell extends from the first end to the second end. The outer shell surrounds a plurality of filtration membranes therein. Each filtration membrane extends generally parallel to the longitudinal axis. A first aeration diffuser is attached to the first end of the module. The first aeration diffuser includes a base having a gas passageway and a liquid passageway fluidically separated from the gas passageway. Liquid is injectable into the liquid passageway of the base of the first aeration diffuser. Liquid flows through the base of the first aeration diffuser and into the module to be filtered by the plurality of filtration membranes. Gas is injectable into the gas passageway of the base of the first aeration diffuser. Gas flows through the base of the first aeration diffuser and into the module to aerate the plurality of filtration membranes.

In yet another aspect, the present invention is directed to a method of operating a pressurized liquid treatment module including injecting liquid into a liquid passageway of a diffuser attached to a pressurized liquid treatment module so that the liquid passes through the diffuser and into the module to contact filtration membrane(s) within the module. The method includes allowing the filtered liquid to exit the module, at least temporarily stopping injection of liquid into the liquid passageway of the diffuser, and at least temporarily stopping filtered liquid from exiting the module. The method further includes injecting gas into a gas passageway of the diffuser. The gas passageway is fluidically separated from the liquid passageway. Gas passes through the gas passageway of the diffuser and into the module to contact and scour the filtration membrane(s).

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

Figures 1, 1A, 1B:
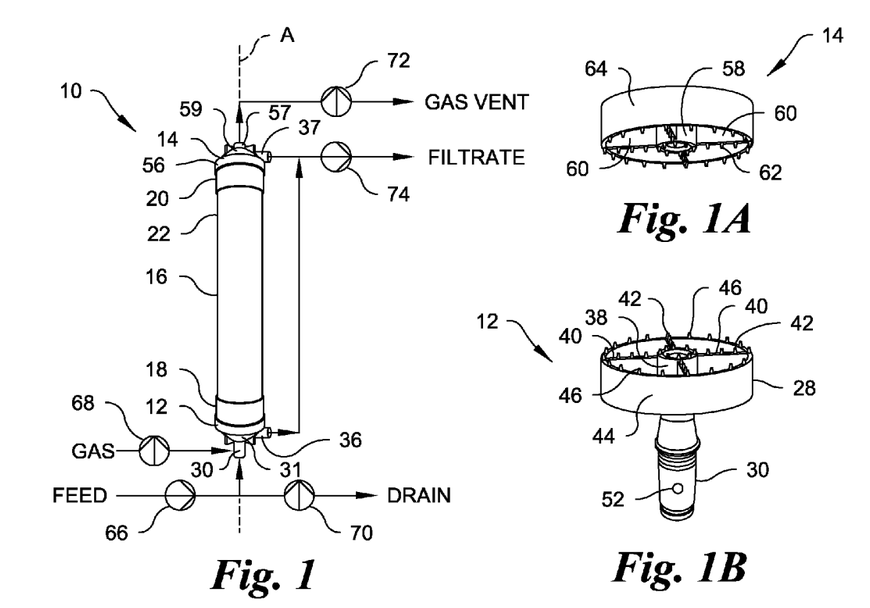
FIG. 1 is a side elevation view of a pressurized liquid treatment module according to a embodiment of the present invention, wherein certain inlets, outlets and valves are shown to identify the flow of gas and liquid through the module.
FIG. 1A is an enlarged bottom perspective view of at least a portion of a second aeration diffuser according to a first embodiment of the present invention.
FIG. 1B is an enlarged top perspective view of at least a portion of a first aeration diffuser according to the first embodiment of the present invention.
Figure 2:
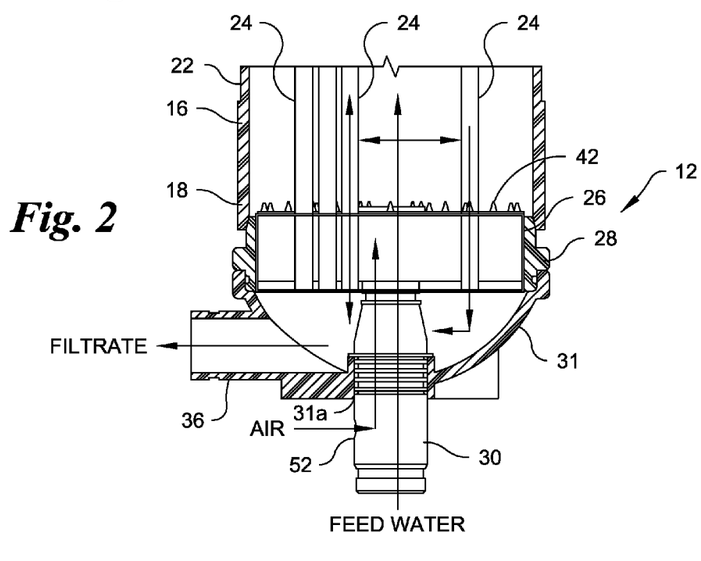
FIG. 2 is an enlarged, partial cross-sectional, elevational view of a portion of the module of FIG. 1 and the first aeration diffuser of FIG. 1B, wherein certain filtration membranes within the module are omitted for clarity.
Figure 3:
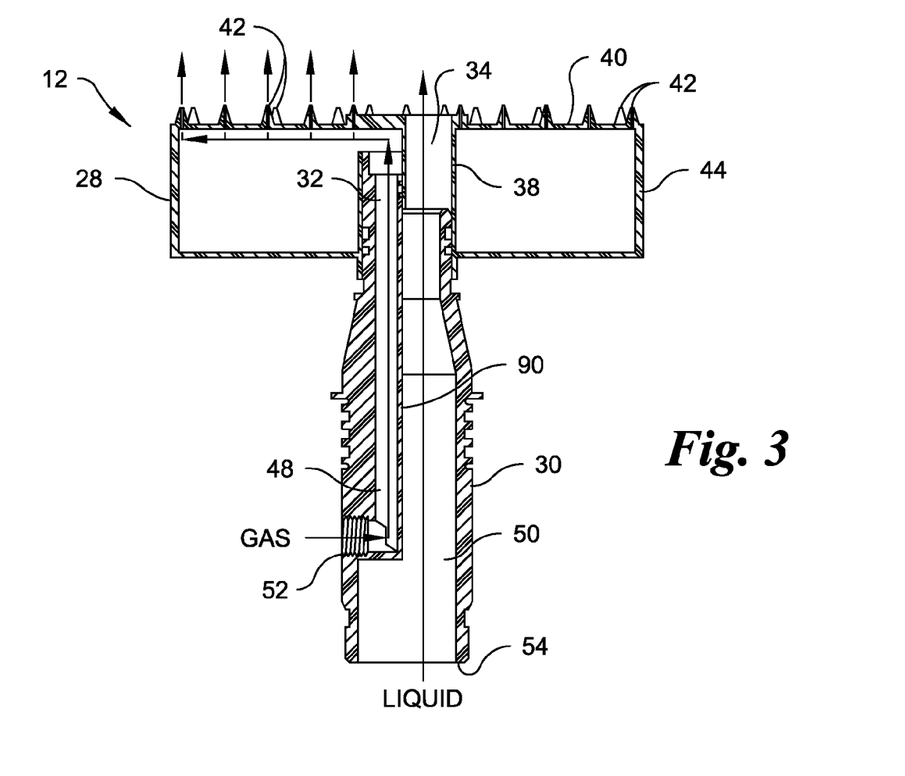
FIG. 3 is an enlarged, cross-sectional, elevational view of the first aeration diffuser of Fig. IB.

Referring to the drawings in detail, wherein like numerals indicate like elements throughout the several views, FIGS. 1-3 show a pressurized liquid treatment module, generally designated 10, and one or more aeration diffusers 12, 14 in accordance with a first embodiment of the present invention. In particular, FIG. 1B shows at least a portion of a first or lower aeration diffuser, generally designated 12, in accordance with a first embodiment and FIG. 1A shows at least a portion of a second or upper aeration diffuser, generally designated 14, in accordance with the first embodiment. The module 10 and the aeration diffusers 12, 14 preferably combine to form a pressurized filtration or other treatment apparatus for liquid, such as water. Piping, pumps and/or other components (not shown) are preferably built around and/or operatively connected to the module 10 through the aeration diffusers 12, 14.

Referring to FIG. 1, the module 10 includes an outer shell 16 having a first or lower end 18 and an opposing second or upper end 20. A longitudinal axis A of the outer shell 16 extends from the first end 18 to the second end 20. The outer shell 16 has a generally cylindrical outer peripheral sidewall 22 and is preferably formed of a polymeric material. However, the module 10 is not limited to such a shape and/or material, as the module 10 may be formed in any shape or from any material that allows for the functionality described herein. The module 10 preferably has a height, as measured along the longitudinal axis A, of several feet, but the module may have any height that is desirable and allows for the functionality described herein. The module 10 may be a nanofiltration, microfiltration or ultrafiltration module, so as to filter relatively small particulate matter, such as colloidal matter.

Referring to FIG. 2, the outer shell 16 of the module 10 at least partially surrounds a plurality of filtration membranes 24 therein. FIG. 2 only shows several filtration membranes 24 for clarity of the surrounding and/or intervening structure. However, numerous filtration membranes 24 are preferably housed within the module 10 in a generally dense or tightly packed, yet at least slightly spaced-apart, manner. Each filtration membrane 24 is generally tubular in shape and is preferably formed of a polymeric material. Each filtration membrane 24 may be formed of a fibrous material, such that each filtration membrane 24 may be a hollow fiber. Each filtration membrane 24 preferably extends generally parallel to the longitudinal axis A. Opposing ends of each filtration membrane 24 are preferably fixed in place within the module 10 by a potting section 26 (i.e., adhesive) proximate at least one, and more preferably both, of the ends 18, 20 of the module 10 and/or in a portion of each aeration diffuser 12, 14. Each filtration membrane 24 is preferably at least partially hollow such that at least some liquid can flow within each filtration membrane 24 either generally parallel or perpendicular to the longitudinal axis A (see the arrows of FIG. 2).

Referring to FIGS. 1 and 1B-3, the first aeration diffuser 12 is preferably fixedly attached to and/or within the first end 18 of the module 10. The first aeration diffuser 12 may be permanently attached to the module 10 or removably attached thereto. Alternatively, the first aeration diffuser 12 may be integrally and unitarily formed with and/or within at least a portion of the first end 18 of the module 10. The first aeration diffuser 12 preferably includes a base 28 and an adapter 30. The base 28 of the first aeration diffuser 12 is preferably fixedly attached to the adapter 30 of the first aeration diffuser 12. The base 28 of the first aeration diffuser 12 may be permanently or removably (e.g., threadably) attached to the adapter 30 of the first aeration diffuser 12. Alternatively, the base 28 of the first aeration diffuser 12 may be integrally and unitarily formed with the adapter 30 of the first aeration diffuser 12. The adapter 30 preferably has a generally cylindrical shape and the base 28 preferably has a wheel shape (e.g., hub and spokes), as described in detail below. However, the base 28 and the adapter 30 of the first aeration diffuser 12 are not limited to such a shape and/or configuration.

Referring to FIG. 3, the base 28 of the first aeration diffuser 12 preferably includes a gas passageway 32 and a liquid passageway 34. The gas passageway 32 of the base 28 of the first aeration diffuser 12 is fluidically separated from the liquid passageway 34 of the base 28 of the first aeration diffuser 12. In other words, the gas passageway 32 is separate and distinct from the liquid passageway 34. A cross-sectional area, such as taken from above and/or below the base 28 of the first aeration diffuser 12, of the liquid passageway 34 of the base 28 is preferably greater than a corresponding cross-sectional area of the gas passageway 32. It is desirable that the cross-sectional area of the liquid passageway 34 be relatively large to minimize frictional pressure loss(es) through the liquid passageway 34.

Referring to FIGS. 1 and 2, the first aeration diffuser 12 preferably includes a connection member 31 that surrounds at least a portion of the base 28 and at least a portion of the adapter 30. The connection member 31 preferably has a generally concave shape and the adapter 30 may be inserted through a central opening 31a thereof. The connection member 31 may be integrally and unitarily formed with the base 28 and the adapter 30, or the connection member 31 may be removeably attached thereto. The connection member 31 preferably includes a fluid exit port 36 that allows filtered or otherwise treated liquid to exit the module 10 through the first aeration diffuser 12 after the liquid has passed through or otherwise circulated within the module 10 (see FIG. 2). In the first embodiment, a cross-sectional area of the fluid exit port 36, as taken generally parallel to the longitudinal axis A, is preferably at least generally circular and greater than that of the gas passageway 32 and the liquid passageway 34 of the base 28. However, the fluid exit port 36 is not limited to such a size, shape and/or configuration.

Referring to FIGS. 1B and 3, the base 28 of the first aeration diffuser 12 preferably includes a central hub 38 and at least two channels 40 extending radially outwardly from the hub 38. More particularly, the base 28 of the first aeration diffuser 12 includes at least two and preferably four equidistantly spaced-apart channels 40 extending radially outwardly from the hub 38. Each channel 40 is in fluid communication with the gas passageway 32 of the base 28 and is fluidically separate from the liquid passageway 34 of the base 28. Each channel 40 has one or more spaced-apart openings 42. As shown in FIGS. 1B and 3, each opening 42 may be formed by a triangular-shaped spike, but the present invention is not so limited. A circumferential member 44 preferably extends around and is in fluid communication with each channel 40. Although the circumferential member 44 is shown to have a generally circular shape, the present invention is not so limited. Similar to each channel 40, the circumferential member 44 preferably has one or more spaced-apart openings 46 to allow gas to pass therethrough to aerate the filtration membrane(s) 24 within the module 10, as described in detail below.

Referring again to FIGS. 1B-3, the adapter 30 of the first aeration diffuser 12 preferably includes a gas passageway 48 and a liquid passageway 50 fluidically separated from the gas passageway 48. As shown in FIG. 3, the gas passageway 48 of the adapter 30 is preferably separated from the liquid passageway 50 by an interior wall 90 that extends radially inwardly into the liquid passageway 50. The adapter 30 of the first aeration diffuser 12 is preferably selectively attachable to the base 28 of the first aeration diffuser 12, such that the gas passageway 48 of the adapter 30 is in fluid communication with the gas passageway 32 of the base 28 and the liquid passageway 50 of the adapter 30 is in fluid communication with the liquid passageway 34 of the base 28. As shown in FIGS. 1B-3, the adapter 30 of the first aeration diffuser 12 preferably includes a gas inlet opening 52 and a liquid inlet opening 54. The gas inlet opening 52 is preferably positioned on and/or within a sidewall of the adapter 30 and the liquid inlet opening 54 is preferably positioned on and/or within a bottom wall of the adapter 30. As shown in FIG. 3, the gas inlet opening 52 may be threaded.

In operation, feed liquid is injectable into the liquid passageway 50 of the adapter 30 of the first aeration diffuser 12 through the liquid inlet opening 54. The liquid flows or is otherwise injected into the liquid passageway 34 of the base 28 and flows therethrough into the module 10 to be filtered by the plurality of filtration membranes 24. The feed liquid to be filtered penetrates the filtration membranes 24, and filtrate liquid flows upwardly and/or downwardly therein. Similarly, gas flows or is otherwise injectable into the gas passageway 48 of the adapter 30 through the gas inlet opening 52. The gas flows or is otherwise injected into the gas passageway 32 of the base 28 and flows therethrough (e.g., through one or more of the openings 42, 46) and into the module 10 to aerate the outside surface of the plurality of filtration membranes 24. In particular, gas exits the first aeration member 12 through the openings 42, 46 and contacts exterior surfaces of the filtration membranes 24.

Referring to FIGS. 1 and 1A, the second aeration diffuser 14 is fixedly attached to and/or within the second end 20 of the module 10. The second aeration diffuser 14 may be permanently attached to the module 10 or removably attached thereto. Alternatively, the second aeration diffuser 14 may be integrally and unitarily formed with and/or within at least a portion of the second end 20 of the module 10. The second aeration diffuser 14 preferably includes a base 56 that is at least substantially similar to the base 28 of the first aeration diffuser described in detail above. For instance, the base 56 of the second aeration diffuser 14 preferably includes a gas passageway (not shown, but refer to the gas passageway 32 described in detail above), a liquid passageway (not shown, but refer to the liquid passageway 34 described in detail above) fluidically separated from the gas passageway, a central hub 58 and at least two channels 60 extending radially outwardly from the hub 58. Each channel 60 is in fluid communication with the gas passageway and fluidically separated from the liquid passageway of the base 56. Each channel 60 has one or more spaced-apart openings 62 to allow gas to pass therethrough. A circumferential member 64 preferably extends around and is in fluid communication with each channel 60.

As shown in FIG. 1, the second aeration diffuser 14 preferably includes an adapter 57 and a connection member 59 that are preferably substantially similar to the adapter 30 and the connection member 31 of the first aeration diffuser 14. The connection member 59 preferably includes a fluid exit port 37 that allows filtered or otherwise treated liquid to exit the module 10 after the liquid has passed through or otherwise circulated within the module 10. Due to the combination of the two spaced-apart fluid exit ports 36, 37, filtrate or filtered or otherwise treated liquid can exit the module 10 at both ends 18, 20 thereof. In the first embodiment, a cross-sectional area of the fluid exit port 37, as taken generally perpendicular to the longitudinal axis A, is preferably at least generally circular. However, the fluid exit port 37 of the second aeration diffuser is not limited to such a shape and/or configuration. In the first embodiment, the base 56 of the second aeration diffuser 14 is identical to the base 28 of the first aeration diffuser 12.

The module 10 preferably has and/or is operable in a first configuration (see FIG. 1) and a second configuration that is at least generally inverted with respect to the first configuration. Gas flows or is otherwise injectable into the module 10 through the first aeration diffuser 12 when the module 10 is in the first configuration, and gas flows or is otherwise injectable into the module 10 through the second aeration diffuser 14 when the module 10 is in the second configuration. In operation in the second configuration, gas flows or is otherwise injected into the gas passageway of the base 56 of the second aeration diffuser 14. In the second configuration, gas flows or is otherwise injected from the gas passageway of the base 56 to and through the channels 60 and out of the second aeration diffuser 14 through the openings 62 and into the module 10 to aerate the plurality of filtration membranes 24. The ability to operate in either or both the first and second configurations allows the filtration membranes 24 within the module 10 to be more easily and/or quickly aerated.

As shown in FIG. 1, liquid and gas are preferably injected into the module 10 and permitted to exit the module 10 by operation of one of a plurality of valves, as described in detail below. Liquid is preferably injected into the module 10 to filter or otherwise treat the liquid. Gas is preferably injected into the module 10 to clean the filtration membranes 24 within the module 10. As described in detail below, liquid and gas may be injected into the module 10 either in series (i.e., subsequently) or in parallel (i.e., simultaneously).

A method of operating the module 10 preferably includes injecting liquid into the liquid passageway 50 of the adapter 30 of the first aeration diffuser 12, preferably by opening a feed valve 66 (see FIG. 1) connected to or associated with the module 10 (step 1). The feed valve 66 is shown as being open in FIG. 1. Liquid preferably travels from the liquid passageway 50 of the adapter 30 of the first aeration diffuser 12 into and through the liquid passageway 34 of the base 28 of the first aeration diffuser 12, and then into the module 10 to contact the filtration membranes 24 within the module 10. During injection of liquid to be filtered into the module 10 a gas valve 68, a drain valve 70 and a gas vent valve 72 are all preferably at least initially closed, as shown in FIG. 1. However, a filtrate valve 74 is preferably at least initially opened, as shown in FIG. 1. The filtrate valve 74 is preferably operatively connected to both of the fluid exit ports 36, 37. After liquid contacts the filtration membranes 24 and is filtered or otherwise treated, the filtered liquid exits the module 10 by passing through one or both of the fluid exit ports 36, 37 (step 2). Steps 1 and 2 can be conducted in series or in parallel.

During steps 1 and 2 above, particulate matter tends to accumulate on and/or within the filtration membranes 24 and the interior of the module 10. To continue to effectively and efficiently filter liquid, the particulate matter should be removed from the filtration membranes 24 and the interior of the module 10. To do so, the injection of liquid into the liquid passageways 34, 50 of the first aeration diffuser 12 is preferably at least temporarily stopped (step 3). This can be done by closing the feed valve 66. In addition, filtered liquid is also preferably at least temporarily stopped from exiting the module 10 (step 4), which can be accomplished by simply allowing all of the filtered liquid to drain from the module 10 through the fluid exit ports 36, 37 or by closing the filtrate valve 74. Steps 3 and 4 can be conducted in series or in parallel.

Next, gas is preferably injected into the gas passageway 48 of the adapter 30 of the first aeration diffuser 12 (step 5). This can be accomplished by opening the gas valve 68. Gas preferably travels from the gas passageway 48 of the adapter 30 of the first aeration diffuser 12 and into and through the gas passageway 32 of the base 28, and then into the module 10 to contact the filtration membranes 24 within the module 10 to scour the filtration membranes 24. Gas is also preferably at least temporarily permitted to exit the module 10 by opening the gas vent valve 72 (step 6). The gas essentially helps to clean the filtration membranes 24 and the interior of the module 10 by loosening the particulate matter from their surfaces. Steps 5 and 6 can be conducted in series or in parallel.

Gas is then preferably at least temporarily prevented from exiting the module 10 (step 7). This can be done by closing the gas vent valve 72. Next, at least some particulate matter scoured from the filtration membranes 24 as a result of the injection of gas into the module 10 is preferably at least temporarily permitted to drain from or otherwise exit the module 10 (step 8). This can be accomplished by opening the drain valve 70. Steps 7 and 8 are preferably conducted in parallel, and are generally considered the first "air scour and drain" steps. Meanwhile, gas is preferably continuously injected into the module 10, as described above in step 5, which promotes draining of the particulate matter.

The draining of the particulate matter is then preferably at least temporarily stopped (step 9). This can be accomplished by simply allowing all of the particulate matter to drain from the module 10 or by closing the drain valve 70. Gas in the module 10 is preferably permitted to exit the module 10 (step 10). This can be done by opening the gas vent valve 72. Steps 9 and 10 are preferably conducted in parallel. Liquid is preferably injected into the liquid passageway 50 of the adapter 30 of the first aeration diffuser 12, and preferably flows into and through the liquid passageway 34 of the base 30 of the first aeration diffuser 12 and into the module 10 (step 11). This can be done by opening the feed valve 66. Step 11 can be conducted in series or in parallel with steps 9 and 10. Steps 9-11 are generally considered the "air scour and refill" steps. Meanwhile, gas is preferably continuously injected into the module 10, as described above in step 5.

The injection of liquid into the module 10 is preferably at least temporarily stopped (step 12). This can be done by closing the feed valve 66. Gas in the module 10 is preferably prevented from exiting the module 10 (step 13). This can be done by closing the gas vent valve 72. Steps 12 and 13 are preferably conducted in parallel. At least some particulate matter scoured from the filtration membranes 24 as a result of the injection of gas into the module 10 is preferably at least temporarily permitted to drain from or otherwise exit the module 10 (step 14). Step 14 can be conducted in series or in parallel with steps 12 and 13. Steps 12-14 are generally considered the second "air scour and drain" steps. Meanwhile, gas is preferably continuously injected into the module 10, as described above in step 5.

The draining of the particulate matter is then preferably at least temporarily stopped (step 15). This can be accomplished by simply allowing all of the particulate matter to drain from the module 10 or by closing the drain valve 70. The injection of gas into the module 10 is preferably stopped (step 16). This can be accomplished by closing the gas valve 68. Gas is also preferably at least temporarily permitted to exit the module 10 (step 17). This can be accomplished by opening the gas vent valve 72. Liquid is injected into the liquid passageway 50 of the adapter 30 of the first aeration diffuser 12, and preferably flows into and through the liquid passageway 34 of the base 30 of the first aeration diffuser 12 and into the module 10 (step 18). This can be done by opening the feed valve 66. Steps 15, 16, 17 and 18 are preferably conducted in parallel, but one or more of these steps can be conducted in series. Steps 15-18 are generally considered the "refill" steps.

Finally, gas in the module 10 is preferably prevented from exiting the module 10 (step 19). This can be done by closing the gas vent valve 72. Filtered liquid is preferably permitted to exit the module 10 (step 20). This can be done by opening the filtrate valve 74. Steps 19 and 20 are preferably conducted in parallel, but can be conducted in series. Steps 1-20 described above can be repeated to filter or otherwise treat liquid and clean the filtration membranes 24. It is preferred that steps 1-20 take approximately six minutes or less to complete. Certain of steps 1-20 may be omitted or conducted in a different sequence, as desired.

FIGS. 4-7 show a second embodiment of the first aeration diffuser 112 of the present invention. The reference numerals of the second embodiment are distinguishable from those of the first embodiment by an addition of one-hundred (100), but otherwise indicate the same or similar elements as indicated in the first embodiment, except as otherwise specified. At least certain portions of the first aeration diffuser 112 of the second embodiment, such as the adapter 130, are substantially similar to those of the first embodiment described above. The description of certain similarities between the embodiments may be omitted herein for the sake of brevity and convenience, and, therefore, is not limiting.

Figure 5:
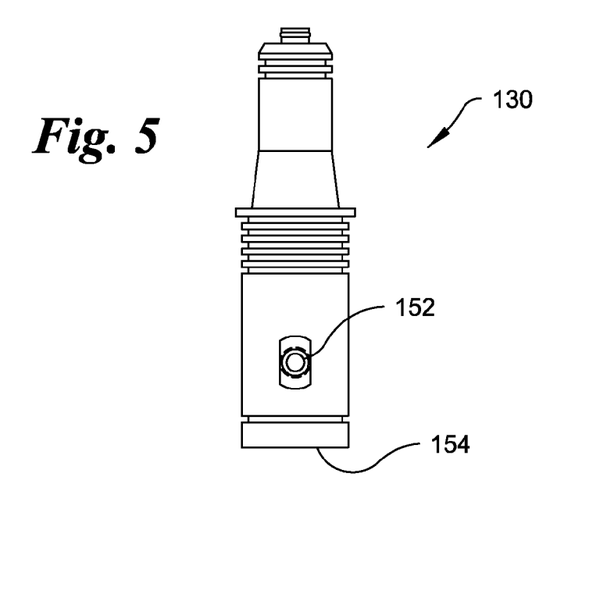
FIG. 5 is a side elevational view of an adapter of the first aeration diffuser of FIG. 4.
Figure 6:
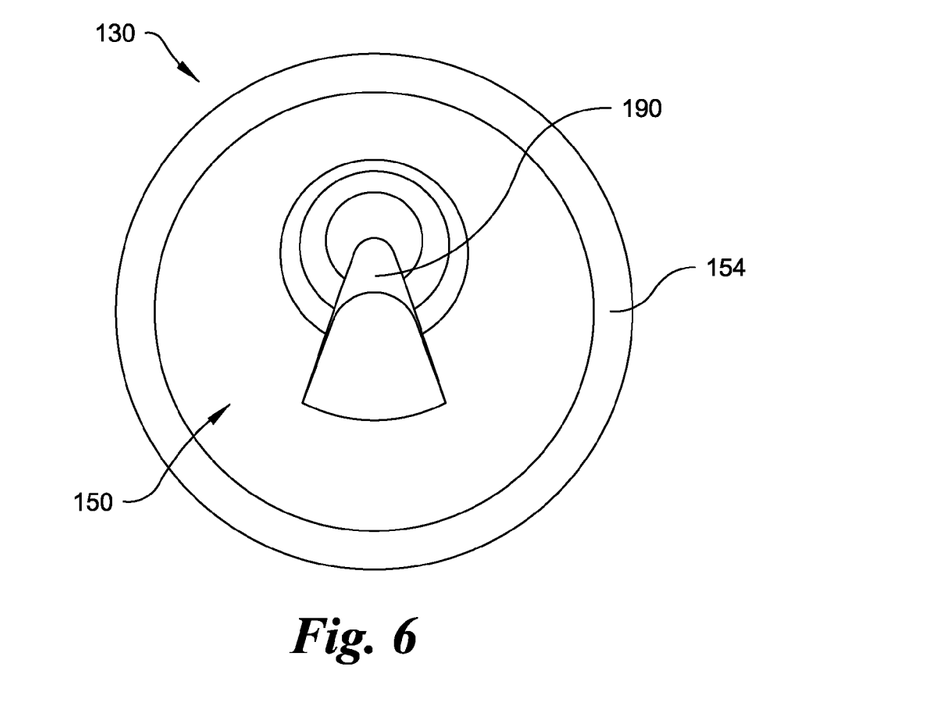
FIG. 6 is a bottom plan view of the adapter of FIG. 5.

As shown in FIGS. 5 and 6, the adapter 130 of the first aeration diffuser 112 of the second embodiment includes the gas inlet opening 152 on a vertical sidewall thereof and a liquid inlet opening 154 on a bottom thereof. The liquid inlet opening 154 is fluidically connected to the liquid passageway 150 of the adapter 130. Similarly, the gas inlet opening 152 is fluidically connected to the gas passageway (not shown) of the adapter 130. As shown in FIG. 6, the gas passageway of the adapter 130 is separated from the liquid passageway 150 by the interior wall 190 that extends radially inwardly into the liquid passageway 150.

Figure 4:
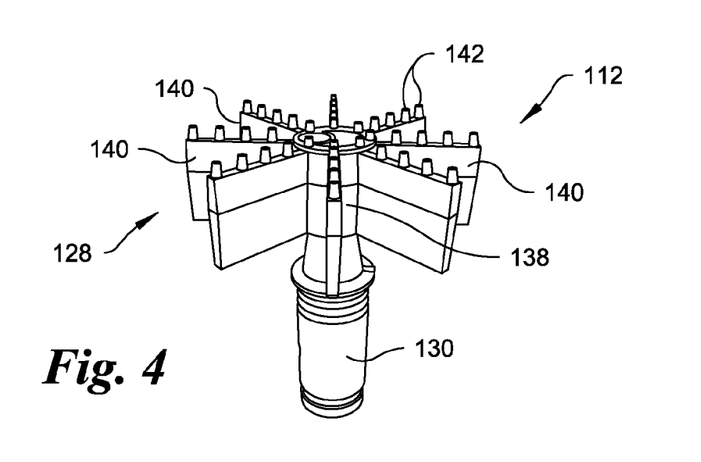
FIG. 4 is a top perspective view of at least a portion of the first aeration diffuser 30 according to a second embodiment of the present invention.
Figure 7:
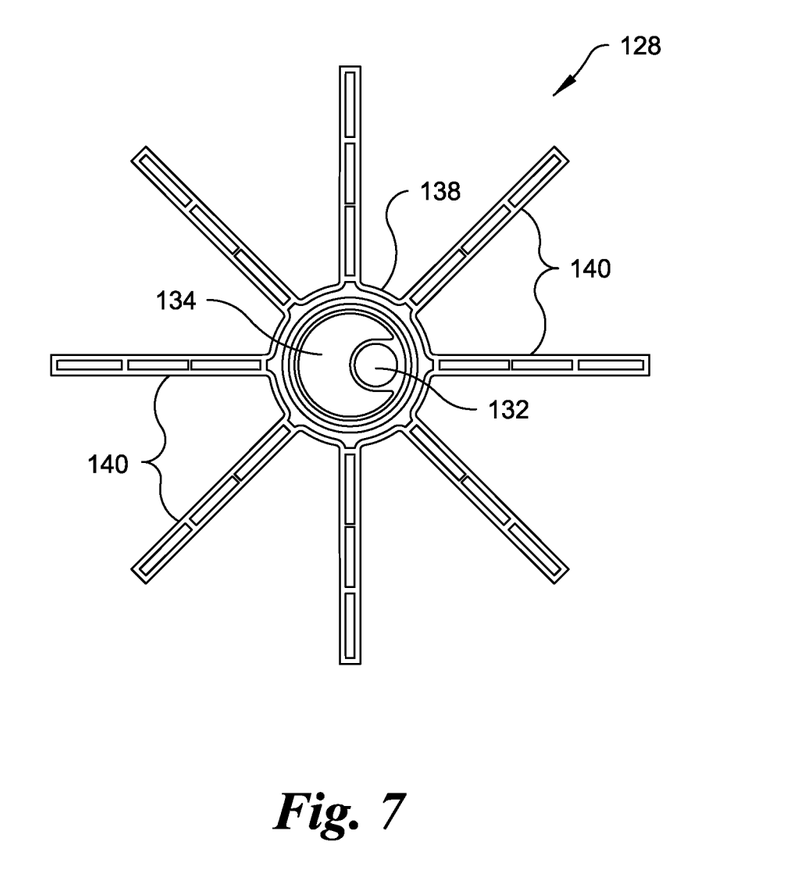
FIG. 7 is a bottom plan view of a base of the first aeration diffuser of FIG. 4.

A distinguishing feature of the second embodiment is that the base 128, as shown in FIGS. 4 and 7, does not include a circumferential member. To the contrary, at least one and preferably the plurality of spaced-apart radial channels 140 extend radially outwardly from the central hub 138. In the second embodiment, the base 128 of the first aeration diffuser 112 includes eight channels 140. Each channel 140 has one or more openings 142 that allow gas to exit the first aeration diffuser 112. A first or inner end of each channel 140 is fixedly attached to the central hub 138 and an opposing second or outer end of each channel 140 is free or otherwise not connected to another structure. As shown in FIG. 7, the central hub 138 surrounds the gas passageway 132 and the liquid passageway 134 of the base 128.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An aeration diffuser for a pressurized liquid treatment module having at least one tubular filtration membrane fixed in the module by a potting section, the diffuser comprising:
   a base having a gas passageway, a liquid passageway fluidically separated from the gas passageway, a central hub, and at least two channels extending radially outwardly from the hub, each channel being in fluid communication with the gas passageway and fluidically separated from the liquid passageway, each channel having at least one opening to aerate the at least one filtration membrane within the module, and
   an adapter including a gas passageway having a gas inlet and a liquid passageway having a liquid inlet and being fluidically separated from the gas passageway, the adapter being selectively fixed to the hub, such that the gas passageway of the adapter is in fluid communication with the gas passageway of the base and the liquid passageway of the adapter is in fluid communication with the liquid passageway of the base,
   wherein liquid is injectable into the liquid passageway of the base, the liquid flowing axially through the hub and into the module on one side of the at least one filtration membrane to be filtered by the at least one filtration membrane within the module, and
   wherein gas is injectable into the gas passageway of the base, the gas flowing through the hub and out of the diffuser through the openings of the at least two channels to aerate the one side of the at least one filtration membrane within the module.

2. The aeration diffuser according to claim 1, wherein each channel includes a plurality of spaced-apart openings.

3. The aeration diffuser according to claim 1, further comprising:
   a connection member at least partially surrounding at least a portion of the base and at least a portion of the adapter, the connection member having a fluid exit port through which filtered liquid exits the module.

4. The aeration diffuser according to claim 1, the base further comprising:
   a circumferential member extending around and in fluid communication with the at least two channels, the circumferential member having at least one opening to aerate the at least one filtration member within the module.

5. The aeration diffuser according to claim 4, wherein the circumferential member has a plurality of spaced-apart openings.

6. A combination pressurized liquid treatment module and at least one aeration diffuser, the combination comprising:
   a pressurized liquid treatment module including an outer shell having a first end and an opposing second end, a longitudinal axis of the outer shell extending from the first end to the second end, the outer shell surrounding a plurality of tubular filtration membranes therein, each filtration membrane extending generally parallel to the longitudinal axis and fixed in the module by a potting section; and
   a first aeration diffuser according to claim 1 attached to the first end of the module,
   wherein liquid is injectable into the liquid passageway of the base of the first aeration diffuser, the liquid flowing axially through the hub of the first aeration diffuser and into the first end of the module on one side of the filtration membranes to be filtered by the plurality of filtration membranes, and
   wherein gas is injectable into the gas passageway of the base of the first aeration diffuser, the gas flowing through the hub of the first aeration diffuser and into the module at the first end of the module on the one side of the filtration membranes to aerate the plurality of filtration membranes.

7. The combination according to claim 6, further comprising:
   a second aeration diffuser which has a same form as the first aeration diffuser, and is attached to the second end of the module,
   wherein gas is injectable into the gas passageway of the second aeration diffuser, the gas flowing through the hub of the second aeration diffuser and out of the second aeration diffuser through the at least one opening to aerate the plurality of filtration membranes.

8. The combination according to claim 7, wherein the channels of the first and second aeration diffusers have a plurality of spaced-apart openings.

9. The combination according to claim 7, wherein the bases of the first and second aeration diffusers each further comprise:
   a circumferential member extending around and in fluid communication with the at least two channels, the circumferential member having at least one opening to aerate the at least one filtration member within the module.

10. The combination according to claim 9, wherein the circumferential member has a plurality of spaced-apart openings.

11. The combination according to claim 6, further comprising:
   a connection member at least partially surrounding at least a portion of the adapter, the connection member having a fluid exit port through which filtered liquid exits the module.

* * * * *